US012435875B2

(12) United States Patent
Nair et al.

(10) Patent No.: US 12,435,875 B2
(45) Date of Patent: Oct. 7, 2025

(54) SYSTEM AND METHOD TO PREDICT AND CONTROL BLOWOUT IN COMBUSTION SYSTEMS

(71) Applicant: Indian Institute of Technology Madras, Chennai (IN)

(72) Inventors: Sujith Raman Pillai Indusekharan Nair, Chennai (IN); Ankan Banerjee, Chennai (IN); Induja Pavithran, Chennai (IN)

(73) Assignee: Indian Institute of Technology Madras (IIT Madras), Chennai (IN)

( * ) Notice: Subject to any disclaimer, the term of this patent is extended or adjusted under 35 U.S.C. 154(b) by 0 days.

(21) Appl. No.: 18/029,757

(22) PCT Filed: Feb. 14, 2023

(86) PCT No.: PCT/IN2023/050150
§ 371 (c)(1),
(2) Date: Mar. 31, 2023

(87) PCT Pub. No.: WO2023/152772
PCT Pub. Date: Aug. 17, 2023

(65) Prior Publication Data
US 2024/0392964 A1 Nov. 28, 2024

(30) Foreign Application Priority Data
Feb. 14, 2022 (IN) .............................. 202241007800

(51) Int. Cl.
*F23N 5/16* (2006.01)
*F23N 5/24* (2006.01)
(52) U.S. Cl.
CPC ............... *F23N 5/16* (2013.01); *F23N 5/242* (2013.01); *F23N 2225/04* (2020.01)

(58) Field of Classification Search
CPC ......... F23N 5/16; F23N 5/242; F23N 2225/04
(Continued)

(56) References Cited

U.S. PATENT DOCUMENTS

| 2016/0273767 A1* | 9/2016 | Unni ........................ F02C 9/28 |
| 2017/0051683 A1* | 2/2017 | Murugesan ............. F23N 5/203 |

(Continued)

FOREIGN PATENT DOCUMENTS

CN 108345956 A 7/2018

OTHER PUBLICATIONS

International Search Report and Written Opinion of the International Searching Authority in relation to International Application No. PCT/IN2023/050150, dated Feb. 14, 2023, 9 pages.

(Continued)

*Primary Examiner* — Vivek K Shirsat
(74) *Attorney, Agent, or Firm* — Convergence Intellectual Property Law P.C; Jonathan Garfinkel

(57) ABSTRACT

The invention discloses systems and methods for predicting and controlling lean blowout in combustion systems such as turbines, engines and combustors. The system 100 is configured to detect and predict time of occurrence of blowout using a computer 105 and to take control action by a controller 110 through actuators 103, to prevent the blowout. The method 200 involves acquiring time series data (202) of combustion in the combustion system, including acoustic pressure amplitude, chemiluminescence intensity, or global heat release rate, fitting a log periodic power law equation to the time series data (208), computing a time of impending blowout using the fit equation (210), and controlling the combustion unit (212) to move away from impending blowout and prevent the blowout. The invention provides for predicting exact blowout times significantly earlier, and to (Continued)

control the combustion unit to prevent blowout, thus enabling reduction in emissions.

11 Claims, 8 Drawing Sheets

(58) Field of Classification Search
USPC .......................................................... 431/13
See application file for complete search history.

(56) References Cited

U.S. PATENT DOCUMENTS

2021/0132555 A1    5/2021  Nair et al.
2021/0372330 A1*  12/2021  Angello ................... G01H 1/12

OTHER PUBLICATIONS

"Early Prediction of Lean Blowout from Chemiluminescence Time Series Data": Sudeepta Mondal et al. Combustion Science and Technology vol. 194, 2022—Issue 6 https://doi.org/10.1080/00102202.2020.1804380, Aug. 27, 2020 (Aug. 27, 2020) pp. 8-20; whole paragraph.

* cited by examiner

SYSTEM AND METHOD TO PREDICT AND CONTROL BLOWOUT IN COMBUSTION SYSTEMS

CROSS-REFERENCES TO RELATED APPLICATION

This application is a 35 U.S.C. § 371 national stage filing of PCT Patent Application Number PCT/IN2023/050150, entitled "System and Method to Predict and Control Blowout in Combustion Systems", filed on Feb. 14, 2023, which claims benefit and priority to Indian provisional patent application No. 202241007800 entitled System and Method to Predict and Control Blowout in Combustion Systems, filed on Feb. 14, 2022, the full disclosures of which are incorporated herein by reference for all purposes.

FIELD OF THE INVENTION

The disclosure generally relates to combustion systems and in particular to methods and systems to control lean blowout in combustion systems.

DESCRIPTION OF THE RELATED ART

To date, fossil fuels are a rich source of energy and are used abundantly in industries such as power plants and aviation. In order to extract the energy, these fuels, or their mixture with air are burnt in a closed environment called the combustor. The process of burning, the combustion, sustains till the flame inside a combustor remains stable and does not blow off. Flame blow off or blowout is a state when the flame inside a combustor becomes extinct due to the reduced flame speed against high flow rates of unburnt gasses. Blowout is a severe problem for engines and one of the major concerns in the power and aviation industry. Examples include but not limited to those which are operated on lean fuel-air mixture in order to satisfy the stringent pollutant emission norms. The lean fuel-air mixture where the number of air molecules per fuel molecule is high, causes a significant reduction of the flame temperature inside a combustor near the reactant flame due to the presence of excess air, therefore, reducing emissions of oxides of nitrogen (NOx). However, such lean conditions make an engine susceptible to blowout. In power plants, blowout can lead to unplanned power outages and can increase operational costs while operating ground-based gas-turbine engines. Aircraft engines are susceptible to both lean and rich blowout.

Precursors to blowout are needed since blowout can lead to catastrophic events such as the sudden shut down of engines in aircraft and power plants. In earlier works, precursors to blowout were developed using several methods based on the translational error (Gotoda et al. 2012, 2014), the symbolic time series analysis (Mukhopadhyay et al. 2013), multifractality (Unni and Sujith 2015), etc. There are a significant number of prior patents on blowout detection to control the phenomena. Lieuwen et al. (US20050056024A1) disclose systems and methods for detecting blowout precursors based on one or a combination of raw data analysis, spectral analysis, statistical analysis, and wavelet analysis of the received optical data. In another patent, Lieuwen and Nair (US20060 13 7353A1) developed blowout detection systems and methods based on analysis of the pressure data for determining the existence of a blowout precursor. Their analysis comprises of one or combination of spectral analysis, statistical analysis, and wavelet analysis.

Recently, Unni et al. (U.S. Pat. No. 10,267,519B2) patented a system and method for controlling blowout based on an analysis of the time series signal using one or more methods. The methods include a Hurst exponent estimation, a burst count estimation, and a recurrence quantification based estimation. However, all these methods provide precursors based on a predefined threshold value.

The invention overcomes some of the challenges mentioned above and provides a simple, facile and less expensive heterostructure fabrication process.

SUMMARY OF THE INVENTION

The present subject matter relates to systems and methods for detecting and controlling lean blowout in combustion units. In various embodiments, the invention includes a system to detect and control lean blowout in a combustion unit. The system comprises a combustion unit having one or more sensors for measuring one or more variables including acoustic pressure amplitude, chemiluminescence intensity, or global heat release rate, generating time series data, and one or more control actuators. The system is provided with a computer unit configured to receive the sensor data, identify impending blowout within a time interval, and fit a log periodic power law equation to the data to predict a time of blowout within the time interval. The system further includes a controller configured to receive the time of blowout information and to issue control instructions to the one or more actuators to prevent the blowout.

In various embodiments, the system comprises a signal conditioner and a digital to analog converter configured to provide sensor data input to the computer and an analog to digital converter configured to process and provide output from the computer to the controller.

In various embodiments, the one or more sensors may be one of a microphone, a piezoelectric transducer, a photomultiplier or a camera. In various embodiments, the one or more actuators include an air valve, a fuel valve, a secondary injector or a pilot flame.

In various embodiments, the invention discloses a method of predicting and preventing lean blowout in a combustion unit by controlling the unit away from the lean blowout. The method comprises the steps of acquiring time series data of combustion in the combustion system, wherein the time series data is one of acoustic pressure amplitude, chemiluminescence intensity, or global heat release rate, followed by identifying a time interval having a beginning time $t_1$ and an end time $t_2$, in which the prediction is to be performed, by observing change in one or more of RMS value of the variable, Hurst exponent, or recurrence quantification measures.

The method then involves identifying log-periodic oscillations by observing a power law variation in the data to identify impeding blowout and fitting a log periodic power law equation to the time series data. In the next step the method involves computing a time of impending blowout using the fit equation. In a final step, the method includes controlling the combustion unit to move away from impending blowout to prevent the blowout In various embodiments of the method, the identifying the time interval includes identifying a consistent increase or decrease in the variable beyond a threshold, or identifying the presence of log periodic oscillations in the time series data.

In various embodiments of the method, the step of computing the time of impending blowout using the fit equation includes computing the coefficients of the log periodic power law equation given by:

$$y(t) = \\ A + B(x)^{\left(\frac{-1}{m-1}\right)} + C_1(x)^{\left(\frac{-1}{m-1}\right)}(\omega\cos(\log(x))) + C_2(x)^{\left(\frac{-1}{m-1}\right)}(\omega\sin(\log(x))) \quad (3)$$

wherein,
y is the variable represented by the time series data
t is instantaneous time
$t_c$ is the estimated time of blowout $$x = t_c - t > 0,$$

ω is the frequency of the log-periodic oscillations,
A, B, $C_1$, $C_2$ are linear parameters,
$t_c$, m, and ω are nonlinear parameters,
wherein the linear and nonlinear parameters are determined by minimizing the cost function $$z = \sum_{i=1}^{n}(p_i - y_i)$$

over a time interval [$t_1$, $t_2$], wherein where $p_i = p_{rms}(t_i)$ is the value of data at $i^{th}$ time $t_i$ and
$y_i = y(t_i)$ is obtained from equation (3).

In various embodiments, the method may comprise determining the linear parameters and the nonlinear parameters separately. In various embodiments, determining the linear parameters may comprise uniquely determining the linear parameters in terms of the nonlinear parameters by equating first-order partial derivatives of the cost function z with respect to linear parameters to zero.

In various embodiments of the method, the control action may be one or more of adjusting fuel-air ratio, fuel flow rate, airflow rate, secondary injections, or turning on a pilot flame.

This and other aspects are described herein.

BRIEF DESCRIPTION OF THE DRAWINGS

The invention has other advantages and features, which will be more readily apparent from the following detailed description of the invention and the appended claims, when taken in conjunction with the accompanying drawings, in which:

DETAILED DESCRIPTION OF THE EMBODIMENTS

Figure 1:
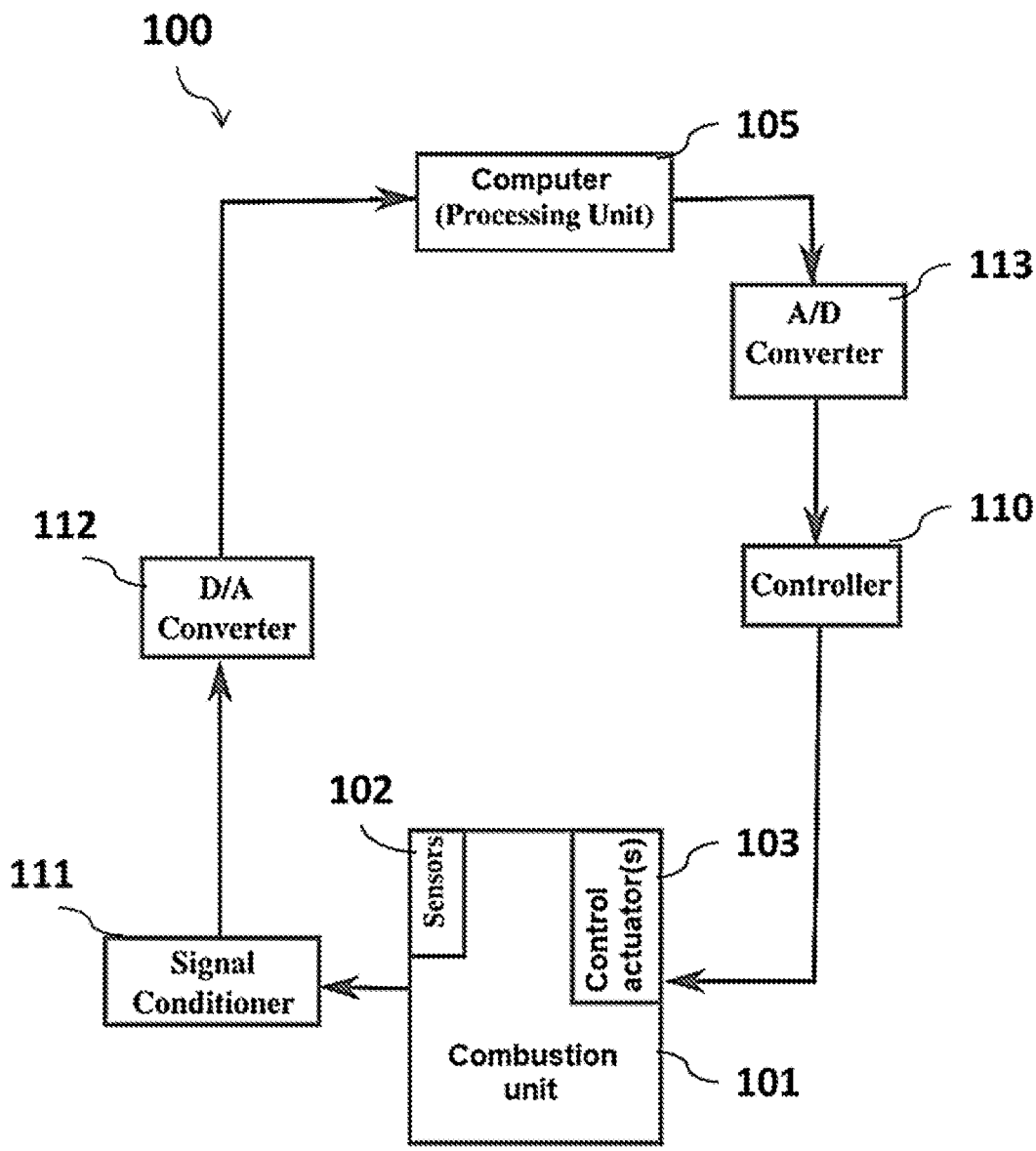
FIG. 1 illustrates a system for predicting and controlling blowout in combustion systems.
Figure 2:
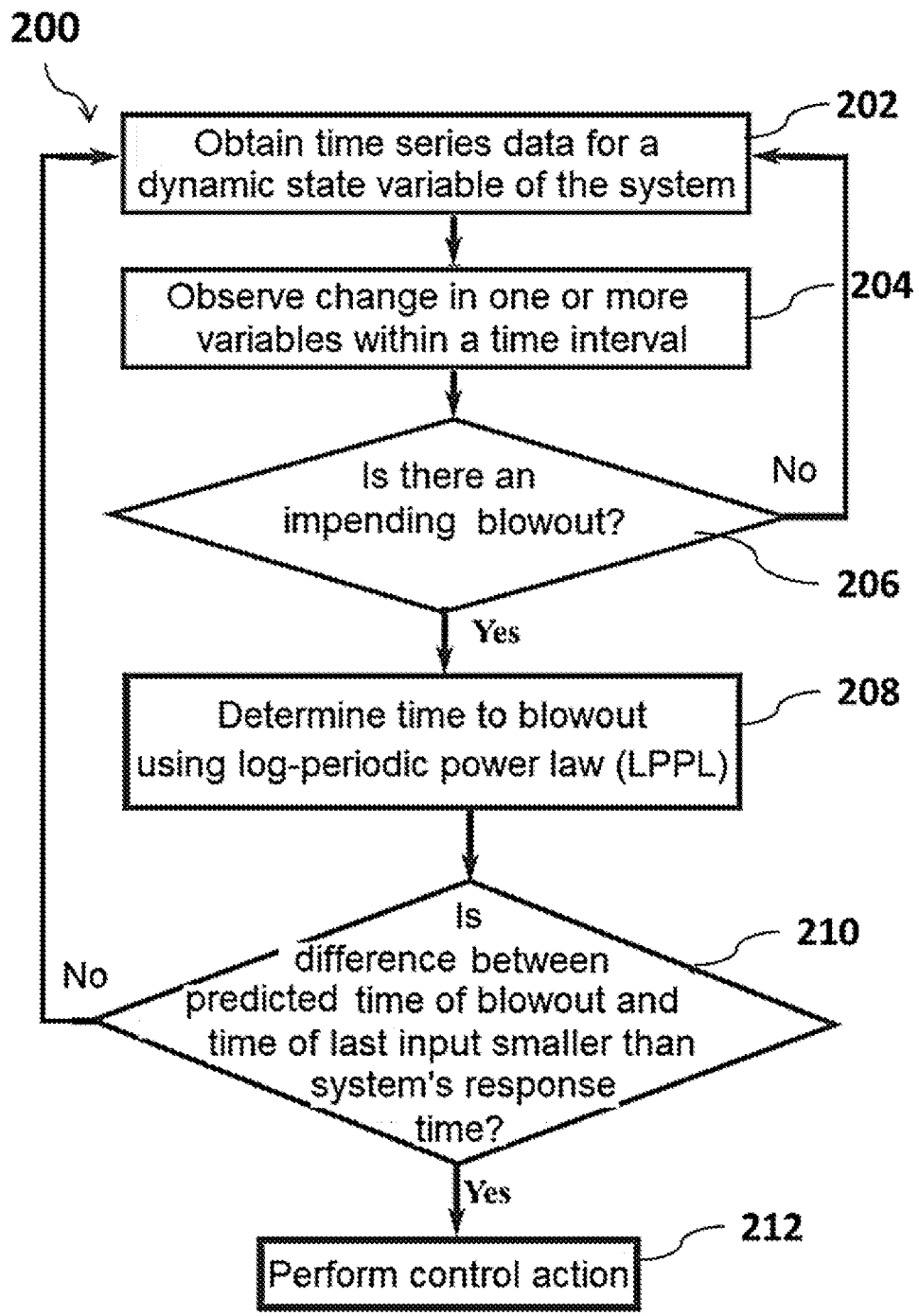
FIG. 2 shows a method of predicting and controlling blowout in combustion systems.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present subject matter describes devices, systems and methods for predicting and controlling lean blowout in combustion systems such as turbines, engines and combustors. The system is configured to detect and predict time of occurrence of blowout and to take control action to prevent the blowout.

In various embodiments, a system 100 to detect and control lean blowout in a combustion unit, is further disclosed with reference to the figures. The combustion unit in various embodiments may be any type of combustor, turbine or engine configured to combust a fuel-air mixture. As disclosed with reference to FIG. 1, the system may comprise a combustion unit 101 having one or more sensors 102 for measuring one or more variables. The variables in some embodiments may include acoustic pressure amplitude, chemiluminescence intensity, or global heat release rate. The sensors are configured to generating time series data of these variables. The system further includes one or more control actuators 103. The system further includes a computer unit 105 that is configured to receive the sensor data, and identify impending blowout within a time interval. The system then fits a log periodic power law equation to the data to predict a time of blowout within the time interval. The system further includes a controller 110 configured to receive the time of blowout information and to issue control instructions to the one or more actuators to prevent the blowout.

In various embodiments, the system may comprise a signal conditioner 111 and a digital to analog or D/A converter 112, configured to provide the sensor data input to the computer 105. The system further includes an analog to digital or A/D converter 113 configured to process and provide output from the computer to the controller. In various embodiments of the system, the sensor 102 may be a pressure transducer such as a microphone, or a piezoelectric transducer. In some embodiments the sensor may be an optical sensor configured to measure a global heat release rate, such as a photomultiplier or a camera. In various embodiments, the one or more actuators 103 may include an air valve, a fuel valve, a secondary injector or a pilot flame. The actuators may be configured to modify the air-fuel ratio or to reignite the flame in the event of blowout.

The invention in various embodiments discloses a method 200 of predicting and preventing lean blowout in a combustion unit. The method is configured to control the unit away from the lean blowout. In various embodiments, the method comprises the step of acquiring time series data 202 in the combustion system. The time series data may be one of acoustic pressure amplitude, chemiluminescence intensity, or global heat release rate within the combustor. The next step involves identifying a time interval 204 having a beginning time $t_1$ and an end time $t_2$, in which the prediction is to be performed, by observing change in one or more measures of the data. The measures in various embodiments may be RMS value of the variable, maxima of the amplitude of frequencies describing the variable, or recurrence quantification measures.

In the next step 206, the method involves computing the running difference between an upper and a lower envelope of the data to identify the presence of log-periodic oscillations. Further, the method involves observing a detrended power law variation in the data to confirm the presence of log-periodic oscillations prior to blowout. In this step, the presence of power law variation in the data is taken as an indication that blowout is imminent, and the data is taken for further analysis. The analysis in step 208 involves fitting a log periodic power law equation to the time series data. The log periodic power law equation is then used to compute a time of impending blowout using the fit equation in step 210. In the final step 212, the method involves controlling the combustion unit to move away from impending blowout to prevent the blowout.

In various embodiments of the method, the identifying the time interval in step 204 includes identifying a consistent increase or decrease in the variable beyond a threshold, or identifying the presence of log periodic oscillations in the time series data. In various embodiments, the step of computing the time of impending blowout using the fit equation in step 208 includes computing the coefficients of the fit equation.

In various embodiments of the method, the log periodic power law equation is given by:

$$y(t) = A + B(x)^{\left(\frac{-1}{m-1}\right)} + C_1(x)^{\left(\frac{-1}{m-1}\right)}(\omega\cos(\log(x))) + C_2(x)^{\left(\frac{-1}{m-1}\right)}(\omega\sin(\log(x))), \quad (3)$$

wherein, y is the variable represented by the time series data, t is instantaneous time, $t_c$ is the estimated time of blowout, $x=t_c-t>0$, $\omega$ is the frequency of the log-periodic oscillations, A, B, $C_1$, $C_2$ are linear parameters, and $t_c$, m, and $\omega$ are nonlinear parameters. The linear and nonlinear parameters are determined by minimizing the cost function, $$z = \sum_{i=1}^{n}(p_i - y_i)$$

over a time interval $[t_1, t_2]$, where $p_i=p_{rms}(t_i)$ is the value of data at $i^{th}$ time $t_i$ and $y_i=y(t_i)$ is predicted value obtained from equation (3).

In various embodiments of the method, the method may comprise determining the linear parameters and the nonlinear parameters separately. The determining the linear parameters may comprise uniquely determining the linear parameters in terms of the nonlinear parameters by equating first-order partial derivatives of the cost function z with respect to the linear parameters to zero.

In various embodiments, the control action may include one or more of adjusting fuel-air ratio, fuel flow rate, airflow rate, secondary injections, or turning on a pilot flame.

In various embodiments of the invention, the system and method of the invention may be implemented in a newly manufactured combustion unit or retrofitted to existing equipment. A possible realization of this invention would involve a unit that can be appended to the combustion unit, which utilizes the measured data, and displays the predicted time of blowout by fitting the log-periodic equation to the variable in real-time and a controller that prevents the blowout.

The invention has several advantages as set forth herein. The system and method have been demonstrated to predict the exact time to blowout in a combustor. Unlike prior art systems and methods that produce warnings of impending blowout, the methods of the invention are configured to predict the exact time of occurrence of blowout without using any user defined threshold values. The disclosed method for predicting blowout in combustion units is configured to make predictions significantly earlier. The system and method of the invention helps to mitigate risk of blowout in engines and combustors and would enable reduction in emissions by providing a smoother transition away from blowout conditions.

EXAMPLES

Example 1: Detection of Oscillations and the Nature of the Power Law in the Data As a prototypical example of the system variable, we consider the root mean squared values ($p'_{rms}$) of the experimentally obtained pressure fluctuations data (p') for characterizing LBO. However, other variables such as global heat release rate, or chemiluminescence may also be used for predicting blowout.

A key part of controlling blowout is the detection of the interval $[t_1, t_2]$ on which prediction is performed. The start and end time of the interval are denoted by $t_1$ and $t_2$ respectively. In the present invention, an appropriate value for $t_1$ depends on early warning signals for blowout such as but not limited to the rise in $p'_{rms}$ in the presence of logperiodic oscillations. Moreover, the decrease/increase in other measures such as Hurst exponent, or recurrence quantification can also be used along with the rise in $p'_{rms}$ or independently to decide the approach to blowout and decide when to start estimating the critical time of blowout. The final point of the interval i.e. $t_2$ is the time associated with the last input data.

Once the interval containing blowout precursory signals is decided, we then examine whether the $p'_{rms}$ data in the interval possess log periodic oscillations. In this regard, we perform a non-parametric test on $p'_{rms}$ by computing the running difference between the upper and lower envelope of the $p'_{rms}$ data. The upper envelope at any time t is the maxima of $p'_{rms}$ until time t. Similarly, the lower envelope at t is the minima of $p'_{rms}$ from t to the end of the time series. We discover the presence of log-periodic oscillations in the $p'_{rms}$ data. Next, we find that $p'_{rms}$ grows faster than exponential and, therefore, can be written as, $$y(t) = A + B(t_c - t)^{\left(\frac{-1}{m-1}\right)} \quad (1)$$

where, y estimates $p'_{rms}$ A, B are linear parameters, and $t_c$ gives predicted blowout time. We also detrend the power law given by equation (1) from the experimentally obtained $p'_{rms}$ data or the input to confirm existence of logperiodic oscillations associated with this power law. The residue $$s(t) = \frac{(p_{rms} - A)}{(t_c - t)^{-1/(m-1)}} \quad (2)$$

showing log-periodic oscillations serves the purpose.

Figure 3A:
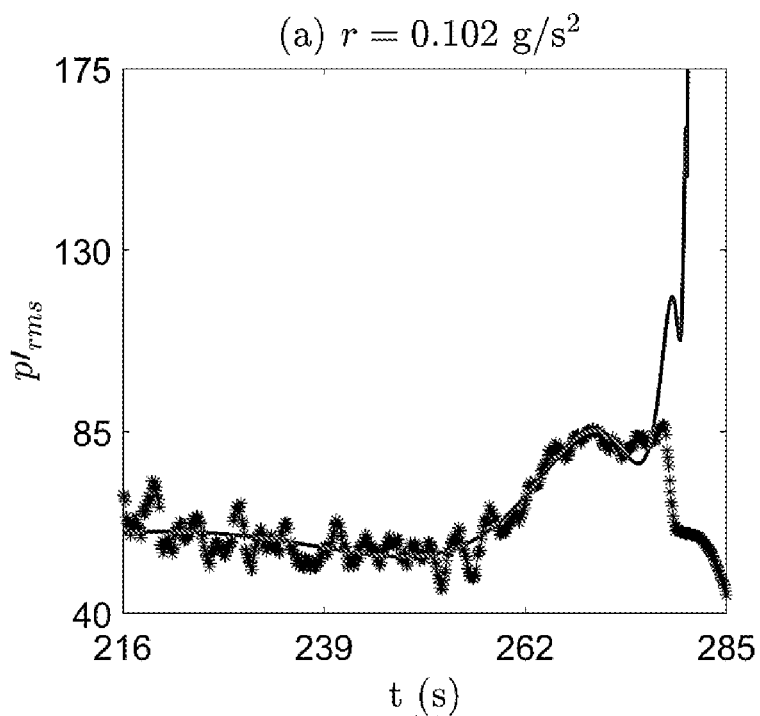
FIG. 3A-3C show log-periodic power law curves (solid curves) fit to the experimentally obtained $p'_{rms}$ data (stars) for different rates of change of airflow (0.102 g/s² in 3A, 0.612 g/s² in 3B and 0.817 g/s² in 3C).
Figure 3B:
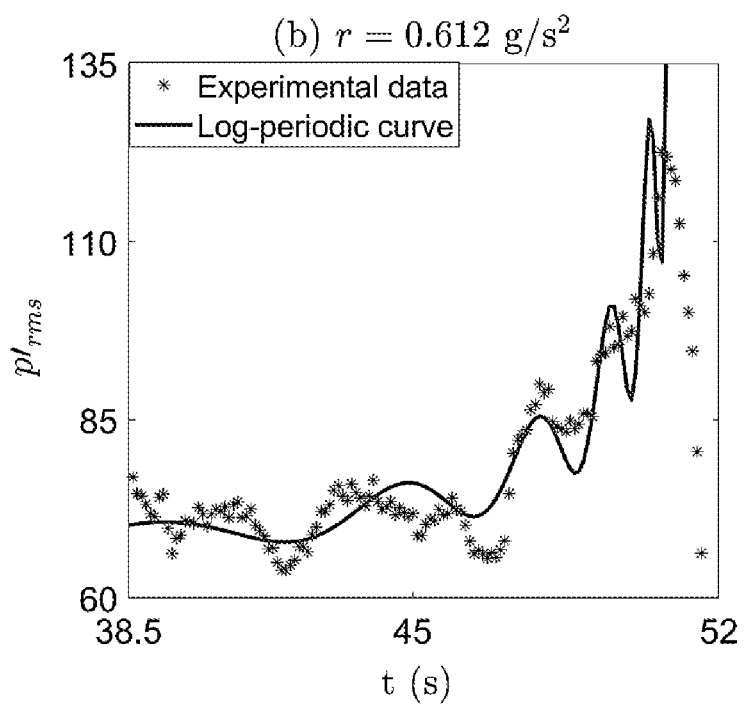
Figure 3C:
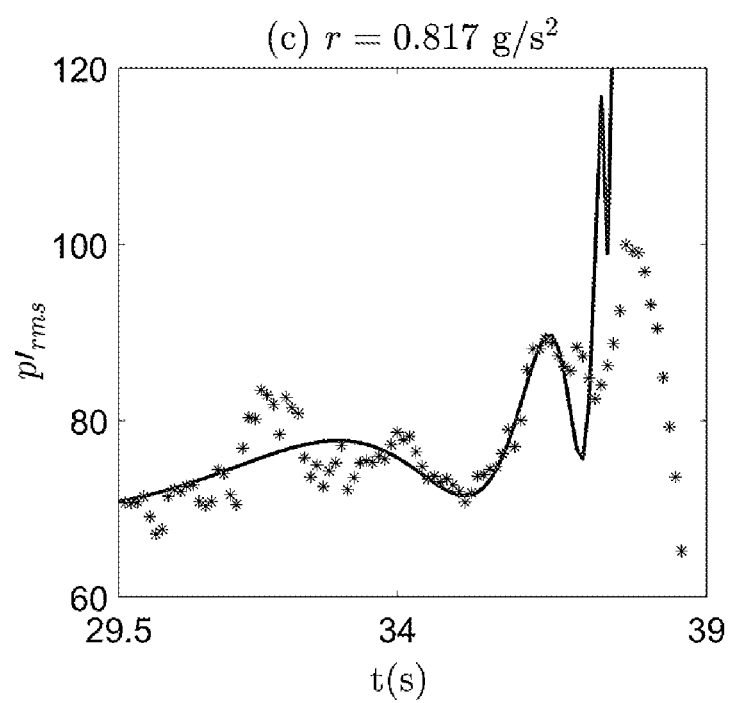

Construction of the Model and its Solution for a Given Data Set:

Following (Filimenov et al. (2013)), we estimate $p'_{rms}$ using log-periodic power law (LPPL) which is given as, $$y(t) = A + B(x)^{\left(\frac{-1}{m-1}\right)} + C_1(x)^{\left(\frac{-1}{m-1}\right)}(\omega\cos(\log(x))) + C_2(x)^{\left(\frac{-1}{m-1}\right)}(\omega\sin(\log(x))), \quad (3)$$

where $x=t_c-t>0$, $\omega$ is the frequency of the log-periodic oscillations. Equation (3) has four linear parameters, namely, A, B, $C_1$, $C_2$ and three nonlinear parameters $t_c$, m, $\omega$. These parameters are determined by minimizing the cost function, $$z = \sum_{i=1}^{n} (p_i - y_i) \quad (4)$$

over a time interval $[t_1, t_2]$, where $p_i=p_{rms}(t_i)$ is the value of data at $i^{th}$ time $t_i$ and $y_i=y(t_i)$ is obtained from equation (3). Among the seven parameters involved in the cost function, linear and nonlinear parameters are solved separately. Initially, linear parameters, namely, A, B, $C_1$, $C_2$ are determined uniquely in terms of nonlinear parameters by equating the first-order partial derivatives of the cost function z with respect to linear parameters to zero. Now z becomes a function with nonlinear parameters only. Then $t_c$, m, $\omega$ are determined using the nonlinear least square (NLS) method. In this invention, we use the NLS method given by but not limited to the Nelder-Mead simplex method (Nelder and Mead (1965)). Any other NLS methods or curve fitting methods are also equally applicable. Once the parameters are determined, we fit the equation (3) over a time interval $[t_1, t_2]$ of a given data set. Fitted curves corresponding to three different rates of change of airflow rates are shown in FIG. 3A-3C.

The obtained LPPL model equation (3) can be fitted to any time series data of a continuously varying system variable. As for an example, in this invention we fit equation (3) to $p'_{rms}$ data for different rates of change of airflow rates. A comparison of predicted blowout time given by a pure power law (equation (1)), LPPL (equation (3)), and actual blowout out is included in Table 1.

TABLE 1

Predicted and Experimentally Determined $T_c$ (time to blowout) for Different Rates of Change of Airflow Rates

| r (g/s²) | $t_1$ (s) | $t_2$ (s) | $t_c$ (s) (equation (1)) | $t_c$ (s) (equation (3)) | $T_c$ (s) |
|---|---|---|---|---|---|
| 0.1 | 230.1 | 276.7 | 282.15 | 284.77 | 277.69 |
| 0.61 | 38.4 | 49.7 | 51.66 | 51.01 | 50.69 |
| 0.82 | 29.9 | 36.7 | 38.5 | 38.1 | 37.69 |
| 1.22 | 19.0 | 24.1 | 25.99 | 25.14 | 25.09 |
| 2.04 | 12.2 | 14.4 | 16.28 | 15.76 | 15.39 |

Figure 4A:
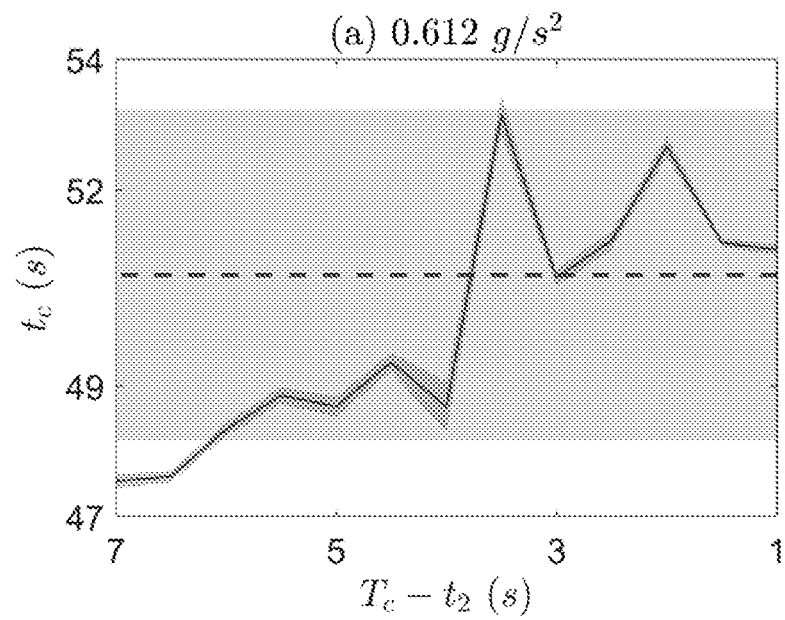
FIG. 4A, 4B show predicted time to the occurrence of blowout ($t_c$) as a function of $t_2$-$T_c$, the dashed line is the blowout time ($T_c$) as obtained from experiment.
Figure 4B:
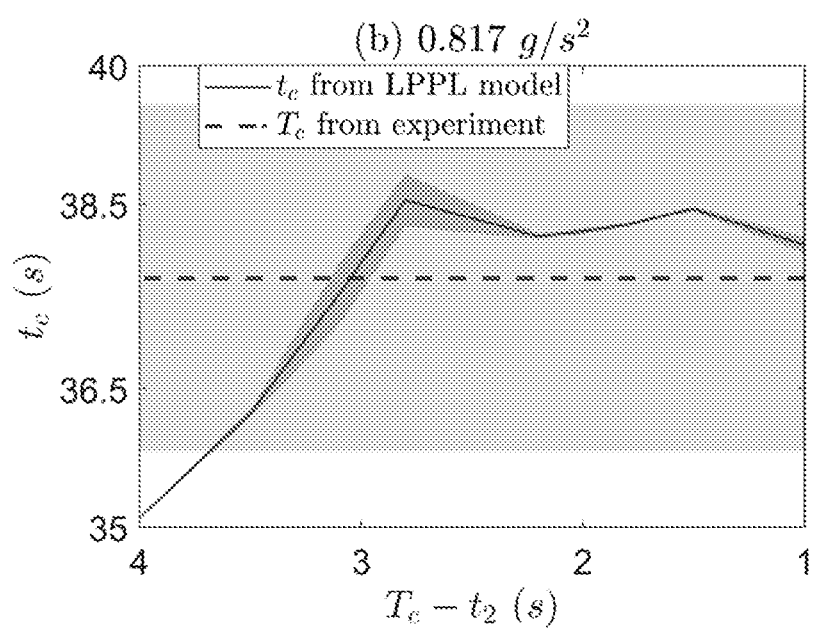

We also computed the predicted blowout time by changing the endpoint ($t_2$) of a time window for a given data set. In these examples, the model can predict blowout several seconds earlier with a precision of 5% to the actual blowout time for different rates of change of airflow rates. FIGS. 4A and 4B show predicted blowout time (solid curves) with its error (shaded regions) and actual blowout time (the dashed line) with a region of uncertainty (the shaded region) for two airflow rates.

Control action is performed based on a response time $t_{ref}$, indicative of the response time of the system, the control unit, and the actuators. When the difference between the obtained $t_c$ and the current data point $t_2$ is less than the said response time $t_{ref}$, we perform control actions such as, but not limited by, adjusting fuel-air ratio, fuel flow rate, airflow rate, secondary injections, turning on a pilot flame, or any other appropriate action. Further, the invention can be implemented through at least one software program running on at least one hardware device and performing network management functions to control the elements.

Figure 5A:
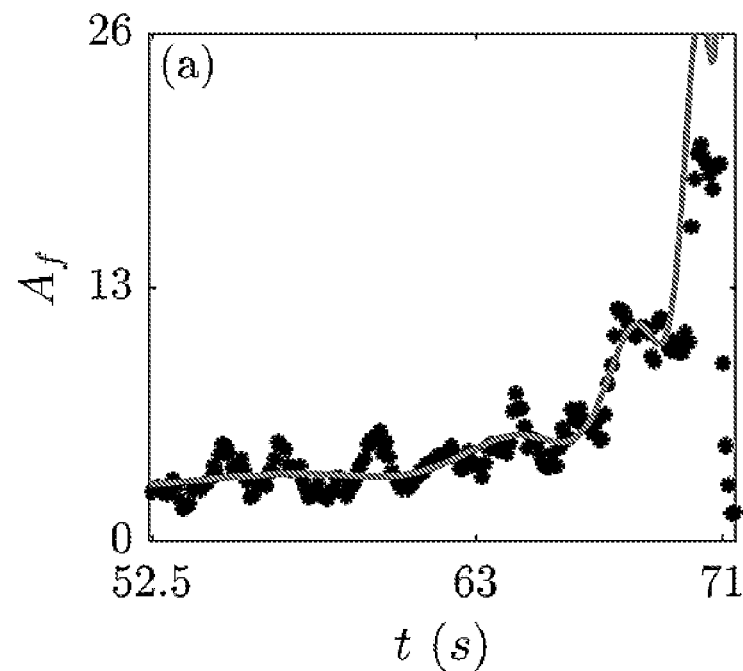
FIG. 5A-5C show log-periodic power law curves (solid curves) fit to the experimentally obtained $A_f$ data (markers) for different change of airflow rates are shown (0.4 g/s² in 5A, 0.8 g/s² in 5B and 1.2 g/s² in 5C).
Figure 5B:
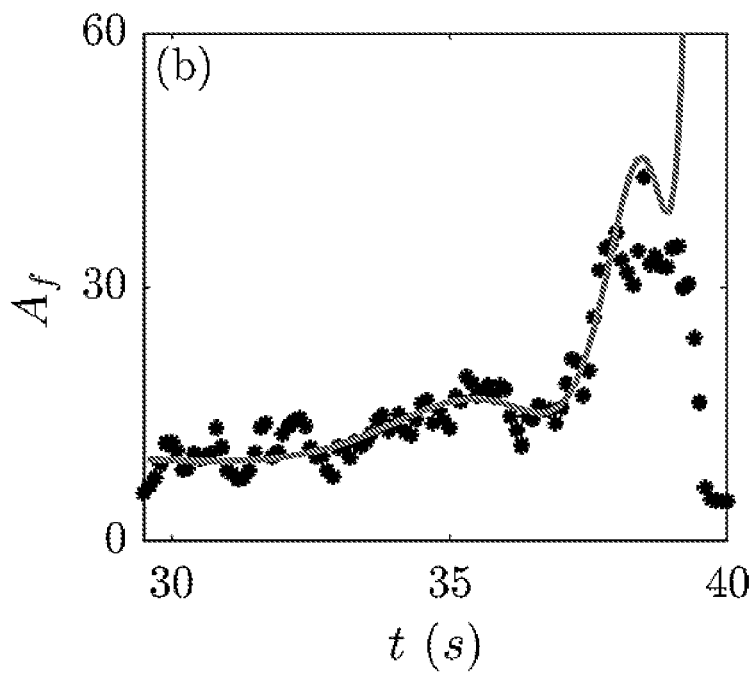
Figure 5C:
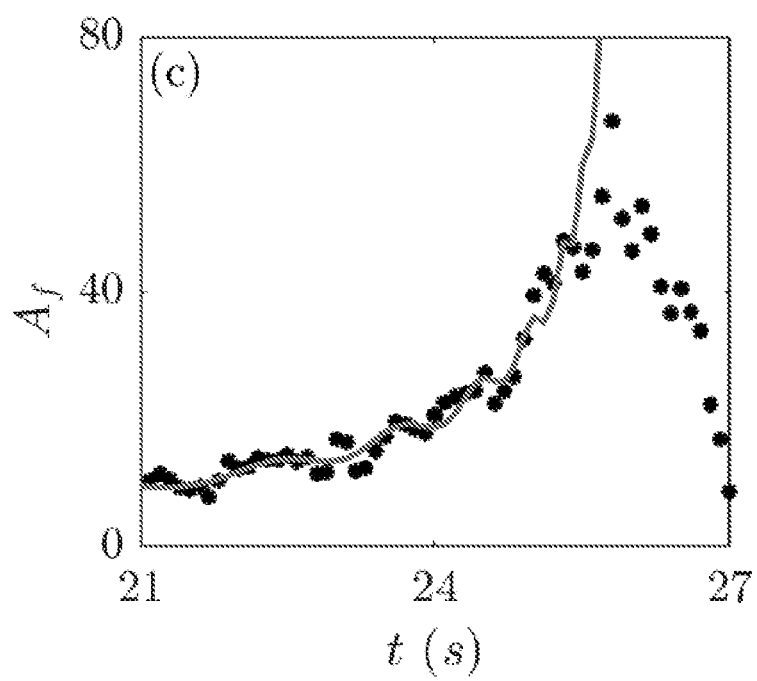

Example 2: Prediction and Control of Blowout Using Amplitude of Low-Frequency Oscillations In addition to $p'_{rms}$, the LPPL equation (3) can be fitted into a time series consisting of maxima of the amplitude of low-frequency oscillations ($A_f$) bearing signatures of log-periodic oscillations, as illustrated in FIG. 5A-5C. The nonlinear parameter values for these curves are: (5A) $t_c=72.6$; m=1.6; $\omega=10.02$, (5B) $t_c=40.4$; m=1.67; $\omega=7.67$ and (5C) $t_c=25.9$; m=2.54; $\omega=14.5$. The time series of ($A_f$) was obtained by finding the maxima of the amplitude spectrum in the low frequency region. The critical time for blowout can be predicted, similar to the case of $p'_{rms}$, by estimating $A_f$ using equation (3). A comparison table consisting of predicted blowout times (obtained by fitting the pure power law (equation (1)) and LPPL (equation (3)) to time series of $A_f$), and the actual time of the occurrence of blowout is illustrated in Table 2.

TABLE 2

Predicted Blowout Times Obtained by Fitting Power Law Equation and LPPL to Time Series of $A_f$

| r (g/s²) | $t_1$ (s) | $t_2$ (s) | $t_c$ (s) (equation (1)) | $t_c$ (s) (equation (3)) | $T_c$ (s) |
|---|---|---|---|---|---|
| 0.1 | 223.8 | 279.1 | 288.5 | 284.7 | 279.7 |
| 0.4 | 52.0 | 69.2 | 75.5 | 73.0 | 70.0 |
| 0.8 | 29.6 | 37.6 | 43.3 | 40.6 | 38.5 |
| 1.2 | 20.8 | 24.8 | 29.2 | 26.2 | 25.9 |
| 2.0 | 12.4 | 14.5 | 16.3 | 16.2 | 15.3 |

Figure 6A:
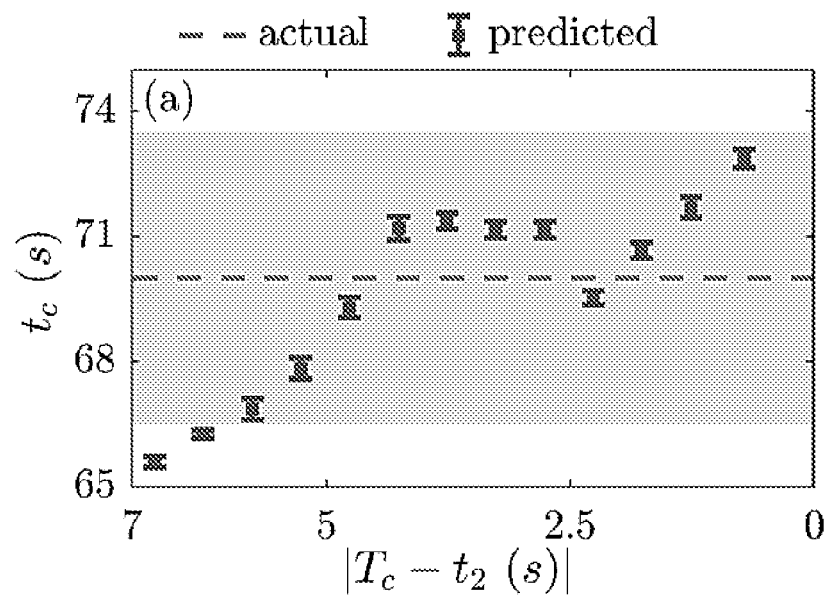
FIG. 6A, 6B illustrate predicted time to blowout ($t_c$) with error bars plotted with respect to $T_c$-$t_2$ for different rates of change of airflow. 0.6 g/s² in 6A and 0.8 g/s² in 6B.
Figure 6B:
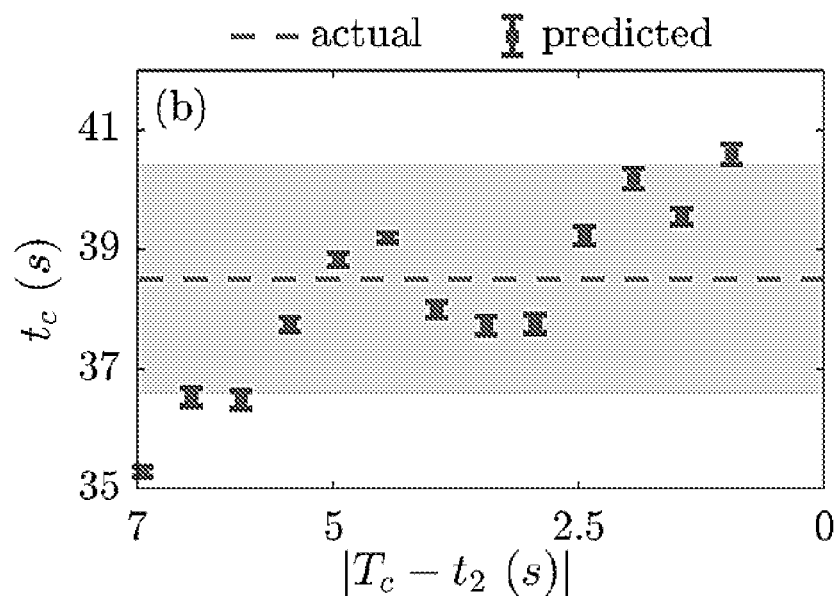

We also analyze how early we can predict blowout by varying $t_2$, the last point of the test interval $[t_1, t_2]$. We set a 5% threshold of $T_c$, to understand how good the prediction is. FIGS. 6A and 6B show the predicted time together with error bars for different values of $t_2$.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope, which should be as delineated in the claims appended herewith.

We claim:

1. A system to detect and control lean blowout in a combustion unit, the system comprising:
   a combustion unit having one or more sensors for measuring one or more variables including acoustic pressure amplitude, chemiluminescence intensity, or global heat release rate, generating time series data, and one or more control actuators;

a computer unit configured to receive the sensor data, identify impending blowout within a time interval, and fit a log periodic power law equation to the data to predict a time of blowout within the time interval; and a controller configured to receive the time of blowout information and to issue control instructions to the one or more actuators to prevent the blowout.

2. The system as claimed in claim 1, comprising a signal conditioner and a digital to analog converter configured to provide sensor data input to the computer and an analog to digital converter configured to process and provide output from the computer to the controller.

3. The system as claimed in claim 1, wherein the sensor may be one of a microphone, a piezoelectric transducer, a photomultiplier or a camera.

4. The system as claimed in claim 1, wherein the one or more actuators include an air valve, a fuel valve, a secondary injector or a pilot flame.

5. A method of predicting and preventing lean blowout in a combustion unit by controlling the unit away from the lean blowout, comprising:

i. acquiring time series data of combustion in the combustion system, wherein the time series data is one of acoustic pressure amplitude, chemiluminescence intensity, or global heat release rate;

ii. identifying a time interval having a beginning time $t_1$ and an end time $t_2$, in which the prediction is to be performed, by observing change in one or more of RMS value of the variable, Hurst exponent, or recurrence quantification measures;

iii. identifying log-periodic oscillations by observing a power law variation in the data to identify impeding blowout;

iv. fitting a log periodic power law equation to the time series data;

v. computing a time of impending blowout using the fit equation; and vi. controlling the combustion unit to move away from impending blowout to prevent the blowout.

6. The method as claimed in claim 1, wherein the identifying the time interval includes identifying a consistent increase or decrease in the variable beyond a threshold, or identifying the presence of log periodic oscillations in the time series data.

7. The method as claimed in claim 1, wherein the step of computing the time of impending blowout using the fit equation includes computing the coefficients of the fit equation.

8. The method as claimed in claim 1, wherein the log periodic power law equation is given by:

$$y(t) = A + B(x)^{\left(\frac{-1}{m-1}\right)} + C_1(x)^{\left(\frac{-1}{m-1}\right)}(\omega\cos(\log(x))) + C_2(x)^{\left(\frac{-1}{m-1}\right)}(\omega\sin(\log(x))) \quad (3)$$

wherein, y is the variable represented by the time series data t is instantaneous time $t_c$ is the estimated time of blowout $x = t_c = t > 0$, $\omega$ is the frequency of the log-periodic oscillations, A, B, $C_1$, $C_2$ are linear parameters, $t_c$, m, and $\omega$ are nonlinear parameters, wherein the linear and nonlinear parameters are determined by minimizing the cost function $$z = \sum_{i=1}^{n}(p_i - y_i)$$

over a time interval $[t_1, t_2]$, wherein where $p_i = p_{rms}(t_i)$ is the value of data at $i^{th}$ time $t_i$ and $y_i = y(t_i)$ is obtained from equation (3).

9. The method as claimed in claim 8, comprising determining the linear parameters and the nonlinear parameters separately.

10. The method as claimed in claim 8, wherein determining the linear parameters comprises uniquely determining the linear parameters in terms of the nonlinear parameters by equating first-order partial derivatives of the cost function z with respect to linear parameters to zero.

11. The method as claimed in claim 5, wherein the control action is one or more of adjusting fuel-air ratio, fuel flow rate, airflow rate, secondary injections, or turning on a pilot flame.

* * * * *